United States Patent [19]

MacMillan

[11] 4,022,554

[45] May 10, 1977

[54] RETREAD MOLDS

[75] Inventor: Kenneth T. MacMillan, Macon, Ga.

[73] Assignee: MacMillan Mold Company, Macon, Ga.

[22] Filed: Dec. 23, 1975

[21] Appl. No.: 643,648

Related U.S. Application Data

[63] Continuation of Ser. No. 568,738, April 16, 1975, abandoned, which is a continuation of Ser. No. 514,486, Oct. 15, 1974, abandoned, which is a continuation of Ser. No. 287,826, Sept. 11, 1972, abandoned.

[52] U.S. Cl. .............................. 425/23; 425/25; 425/36; 425/43; 425/46
[51] Int. Cl.² ........................................... B29H 5/04
[58] Field of Search ............... 425/17, 18, 19, 20, 425/21, 22, 23, 24, 25, 26, 44, 36, 35, 78

[56] References Cited

UNITED STATES PATENTS

| | | | |
|---|---|---|---|
| 2,375,784 | 5/1945 | Glynn | 425/23 X |
| 2,437,127 | 3/1948 | Richardson | 425/78 X |
| 2,562,876 | 8/1951 | Balza | 425/78 |
| 2,745,137 | 5/1956 | Glynn | 425/23 |
| 2,835,921 | 5/1958 | White | 425/44 X |
| 2,903,742 | 9/1959 | Barefoot | 425/23 X |
| 3,184,794 | 5/1965 | Sherkin | 425/36 X |
| 3,396,221 | 8/1968 | Balle et al. | 425/43 X |
| 3,465,385 | 9/1969 | Zanyl | 425/23 X |
| 3,520,024 | 7/1970 | Caretta et al. | 425/38 |
| 3,579,736 | 5/1971 | Balle et al. | 425/38 |
| 3,585,686 | 6/1971 | Balle | 425/19 |
| 3,590,433 | 7/1971 | Rawls | 425/19 |
| 3,682,576 | 8/1972 | Gross | 425/46 |
| 3,701,615 | 10/1972 | Johnson | 425/23 |
| 3,729,358 | 4/1973 | Barefoot | 425/21 X |

FOREIGN PATENTS OR APPLICATIONS

1,160,606 1/1964 Germany ...................... 425/47

*Primary Examiner* — J. Howard Flint, Jr.
*Attorney, Agent, or Firm* — Diller, Brown, Ramik & Wight

[57] ABSTRACT

This disclosure relates to retread molds adapted for manual, semi-automatic, or fully automatic operation in either bag or bagless retreading operations, and includes a pair of bead aligner wheels which are retracted to permit tire beads to become self-adjusting or floating thereby seeking their own natural position permitting a wider range of tire sizes to be properly cured in the same matrix, the molds further including a seal in the form of at least a single O-ring seal contacting the exterior of each tire side wall to preclude pressurized fluid within the mold cavity from escaping to atmosphere, and in the automatic version means are provided for automatically inserting a bag in the tire, locking the mold, inflating the bag, and reversing these functions prior to the removal of the cured tire.

2 Claims, 8 Drawing Figures

RETREAD MOLDS

This is a continuation of application Ser. No. 568,738, filed Apr. 16, 1975, now abandoned, which in turn is a continuation of application Ser. No. 514,486, filed Oct. 15, 1974, now abandoned, which in turn is a contiuntation of application Ser. No. 287,826, filed Sept. 11, 1972, now abandoned.

This invention relates to novel retread molds adapted for manual, semi-automatic, or fully automatic operation in either bag or bagless retreading operations, and in one embodiment a pair of bed aligner wheels are retracted to permit tire beads to self-adjust or float thereby seeking their own natural position permitting a wider range of size of the tires to be properly cured in the same matrix.

A further object of this invention is to provide another mold which includes a pair of relatively movable supports, co-operative matrix portions carried by the suports, means for imparting relative movement to the supports to move the matrix portions between open and closed positions in the latter of which the matrix portions define a cavity adapted to recieve a tire to be retreaded, and means in the form of a seal about the exterior of each side wall of the tire when in the cavity to preclude pressurized fluid therein from escaping to atmosphere, with each seal being in the form of at least a single 0-ring seal.

In further keeping with this invention a novel mold of the type aforesaid is provided wich is particularly adapted for use with an inflatable bladder (manually or automatically operable) which when inserted into the inerior of the tire and inflated precludes the passage of pressurized air or a similar pressurized fluid through the tire interior and into the tire carcass between the buffed area and the new rubber thus precluding separation after curing or what is termed in the industy "mold blow".

A further object of this invention is to provide in each of the molds heretofore described novel locking means to maintain matrices securely and safely locked during a retreading cycle thus precluding accidental and/or inadvertent injury to personnel or machinery.

With the above, and other objects in view that will hereinafter appear, the nature of the invention will be more clearly understood by reference to the following detailed description, the appended claims and the several views illustrated in the accompanying drawings.

Figure 1:
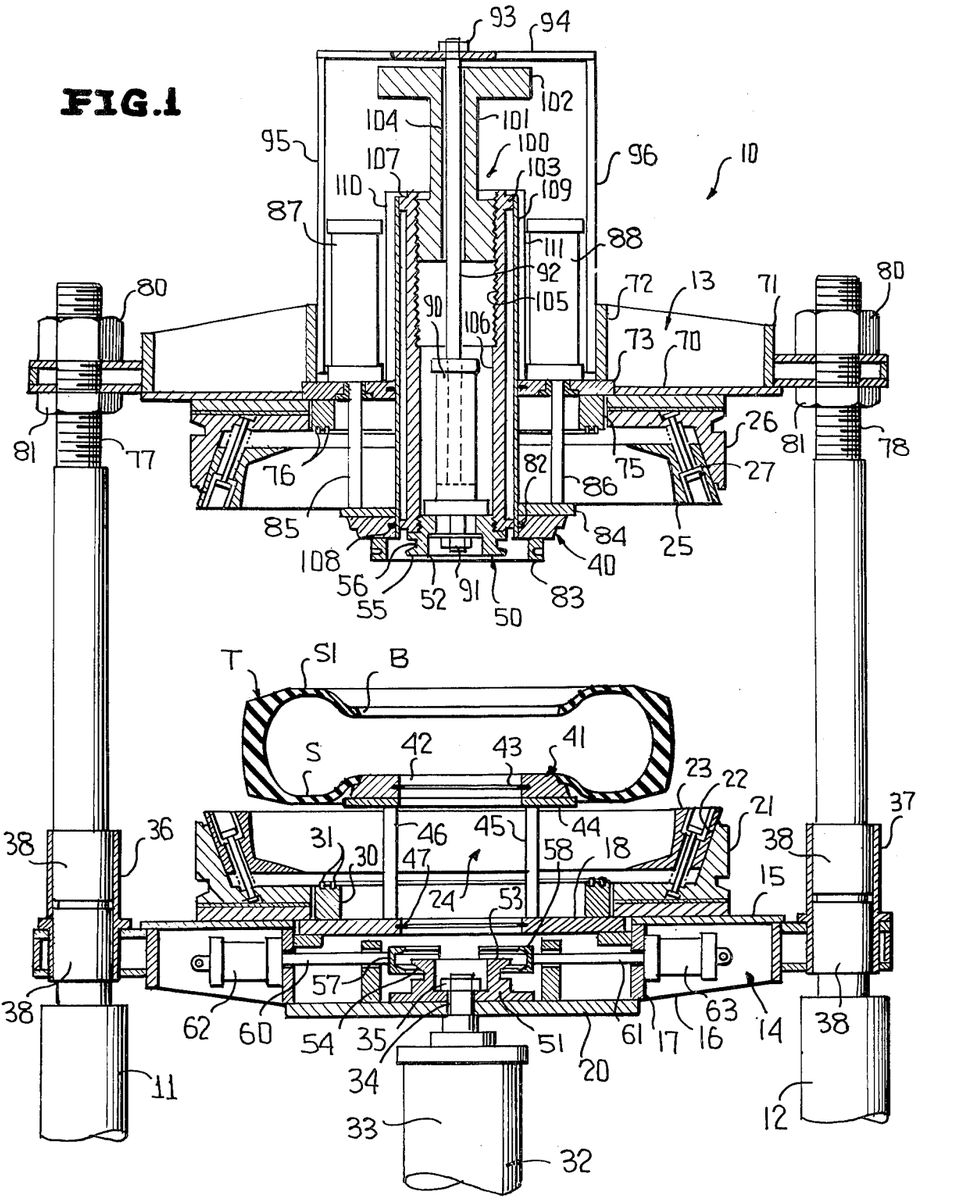
FIG. 1 is a fragmentary generally vertical sectional view taken through the first retreading machine of this invention, and illustrates matrix supports in their open position with a tire supported upon a lowermost bead aligner wheel incident to the closing of the retread cavity, as defined by opposed matrix portions.
Figure 2:
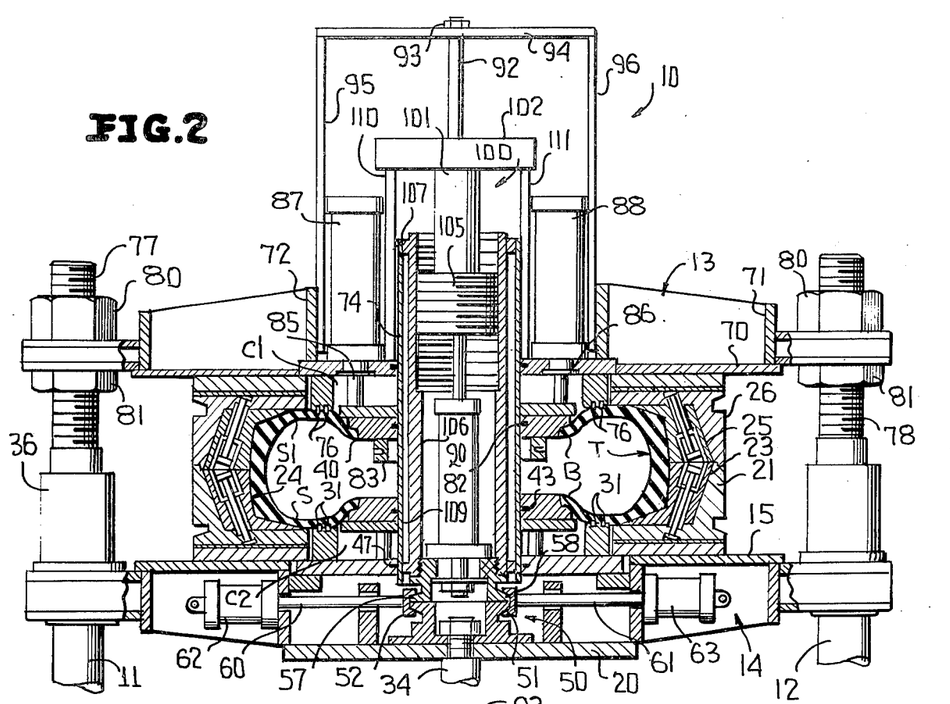
FIG. 2 is a view of the retread machine of FIG. 1, but illustrates the components thereof in a closed position prior to the retraction of the bead aligner wheels.
Figure 3:
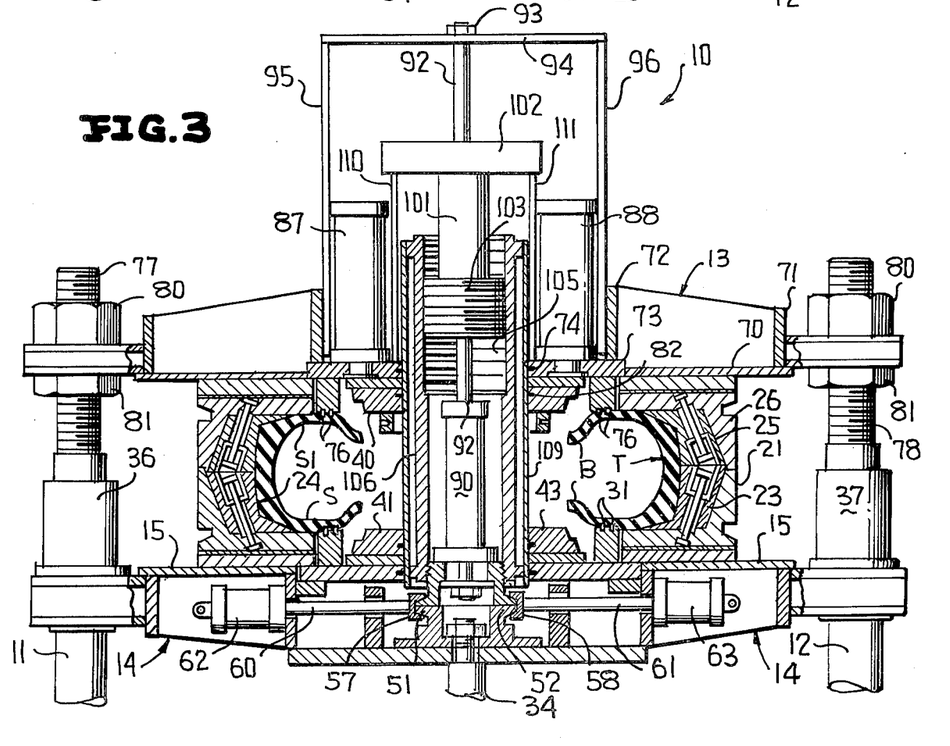
FIG. 3 is a view of the retread machine similar to FIG. 2, and illustrates the bead aligner wheels in their retracted position with the tire beads being "floating".

A novel retread machine or mold, generally designated by the reference numeral 10, is fully illustrated in FIGS. 1 through 3 of the drawings, and includes in addition to a base (not shown) a plurality of vertical standards 11, 12 of which only two of four illustrated for purposes of simplicity. These standards when viewed from above occupy positions generally equidistant from each other at approximate corners of the retread machine 10. However, the particular number of the standards 11, 12 or their disposition relative to other components is immaterial.

The retread machine 10 includes an upper stationary support or platen 13 and a lower movable support or platen 14.

Condsidering first the lower support 14, the same includes a suitable plate 15 having a peripheral wall 16 surrounding the perimeter of the plate 15, and another peripheral wall 17 inboard thereof. Suitable bridging plates 18, 20 are provided and are joined to form a relatively rigid platform upon which is suitably secured a mold frame 21 of an annular configuration having an internal tapered generally frusto-conical surface 22. The frusto-conical surface 22 of the mold frame 21 serves as a guide for the movement of the matrix sections 23 which in the closed position thereof (FIGS. 2 and 3) define one-half of a mold cavity 24 with the total of the latter being additionally defined by like matrix sections 25 of a mold frame 26 carried by the upper stationary support 13 having a smiliar frusto-conical guide surface 27. The details of elements 24 through 27 form no part of this invention but reference may be made to commonly assign Application Ser. No. 243,366 filed March 11, 1972 and entitled Matrix Assembly with Segmented Matrices now U.S. Pat. No. 3,778,203, issued on Dec. 11, 1973.

Fixedly secure atop the plate 18 by bolts or the like is an annular plate 30 having in an upper face (unnumbered) two upwardly opening grooves in each of which is confined a resilient O-ring seal 31. The O-ring seals 31 are adaptad to seat against an exterior surface (unnumbered) of a side wall S of a tire T having beads B which is to be retreaded in the mold cavity 24, as will be described more fully hereinafter.

In order to move the mold frames 21, 26 relative to each other to form the closed cavity 24 of FIGS. 2 and 3 suitable fluid motor means generally designatad by the reference numeral 32 is provided in the form of a fluid cylinder 33 and a piston rod 34 thereof secured to the movable support or platen 14 by an appropriate nut 35. When fluid from a pressurized source (not shown) is introduced into the cylinder 33 the piston rod 34 moves upwardly from the position shown in FIG. 1 to that shown in FIG. 2 resulting in the closing of the matrix sections 23, 25. In a like manner fluid withdrawn from the cylinder 33 results in the movement of the support 14 from the position shown in FIGS. 2 and 3 to that of FIG. 1 with the decent of the support 14 being achieved by virtue of its weight and the action of gravity, and regulated appropriately by the bleed-off of fluid from the cylinder 33. During the movement of the support 14 between the open and closed positions of the cavity 24 the support 14 and the components carried thereby are guided by appropriate sleeves 36, 37 secured to the support 14 in a conventional manner and being guided upon the reduced ends (unnumbered) of the posts 11, 12, respectively, by suitable busings 38. The remaining unillustrated corners of the support 14 carry like sleeves 36, 37 associated with the remaining two upstanding posts.

Means for aligning the tire T relative to the cavity 24 is in the form of a pair of cooperative bead aligner wheels 40, 41, the latter of which includes in an inner annular opening 42 a groove (unnumbered) seating an O-ring seal 43. The bead aligner wheel 41 is appropriately stepped at its outer circumference and is secured to a plate 44 which is in turn secured to a pair of vertical posts 45, 46, each of which is in actuality a piston rod passing through an aperature (unnumbered) of the plate 18 and conventionally housed in a cylinder (not shown) fixed to the same plate 18. By appropriately applying fluid pressure (air) into the cylinders (not shown) associated with the rods 45, 46, the latter rods may be moved upwardly or downwardly as may be found necessary or desirable, in a manner to be described more fully hereinafter. The plate 18 likewise includes a groove (unnumbered) which recieves an O-ring seal 47 with the seals 43, 47 being cooperative in a manner described more fully hereinafter.

The movable platen or support 14 also carries a first locking member 51 of cooperative locking means, generally designated by the reference numeral 500, which additionally includes a second locking member 52 carried by the stationary support or platen 13, though movable relative thereto in a manner to be described more fully hereinafter. However, the first locking member of element 51 is suitably secured to the lower plate 20 of the platen 14 and is of a generally cylindrical configuration having at its upper face a generally flat annular surface 53 and at its lower face a generally frusto-conical surface 54. Like faces 55, 56 are associated with the second locking element 52 of the cooperative locking means 50. With the faces 55, 56 in contact, as shown in FIGS. 2 and 3, the frusto-conical surfaces 54, 56 may be clamped or locked by two or more clamping elements 57, 58. Pressurized fluid (air) from a suitable source (not shown) is introduced into the cylinders 62, 63 in a conventional manner to extend the rods 60, 61 from the position shown in FIG. 1 to that shown in FIGS. 2 and 3 at which the first and second locking elements, 51, 52, respectively, are clamped or locked tightly to each other by virtue of the cooperative unnumbered faces or surfaces corresponding to the surfaces 54, 56 of the respective locking elements 51, 52. In a like manner the retraction of the piston rods 60, 61 result in the unclamping of the clamps 57, 58 and eventual retraction of the second locking means 52 relative to the first locking means 51 from the position shown in FIGS. 2 and 3 to that shown in FIG. 1.

Reference is now made in regard to the details in construction of the upper stationary platen or support 13 which includes a plate or wall 70 reinforced by a peripheral wall 71 and an inntermost wall 72 which in turn is welded or otherwise secured to a plate 73 having an opening 74 wich is grooved and receives a O-ring seal (unnumbered). As in the case of the mold frame 21 carried by the stationary support 14, the mold frame 26 is secured to the plate 70 in a conventional manner and inboard thereof is an annular wall 75 having a pair of grooves (unnumbered) which receive O-ring seals 76 adapted to seat against and seal the opposing side wall Sl of the tire T as is most evident from FIGS. 2 and 3 of the drawings.

At each of four corners of the plate 70 the same is secured by appropriate means to threaded upper ends 77, 78 of the posts 11, 12, respectively and like structure relative to the remaining two unillustrated posts. Through a pair of nuts 80, 81 the position of the platen 13 ca be adjustably established thereby providing adjustment for matrix sections of different cross-sections to permit different size tires to be retreated in the cavity 24, though altered due to tire size or matrix design. For example, for a narrower tread tire the support 13 would be lowered whereas the opposite would be done for a wider tread tire with such adjustment being desired to maintain the parting line of the cavity 24 precisely at the plane bisecting the tire T into equal halves with the latternoted plane being the one passing through the tire axis normal thereto.

As was heretofore noted, the stationary support or platen 13 also carries a bead aligner wheel 40 which additionally includes an opening (unnumbered) corresponding to the opening 42 of the bead aligner wheel 41 and carrying in a groove (also unnumbered) thereof an O-ring seal 82. Also secured to the bead aligner wheel 40 is a conventional annular heater 83 which may be of the radiant type. The bead aligner wheel 40 is suitably secured to a plate 84 which in turn is secured to a pair of rods 85, 86 which are in turn received in fluid cylinders 87, 88, respectively. As in the case of the bead aligner wheel 41, fluid may be selectively introduced into or withdrawn from the head and/or rod ends of the cylinders 87, 88 to reciprocate the bead aligner wheel 40 as found necessary or desirable in conjunction with the operation of the bead aligner wheel 41 through conventional systems forming no particular part of this invention.

Reference is now made to details of the cooperative locking means 50, and particularly the manner in which the second locking member or element 52 is moved vertically relative to the first locking element 51. The locking element 52 is suitably coupled to a cylinder 90 as, for example, by a stud and nut 91 with the cylinder 90 having a rod 92 whose end is secured by a nut 93 to a cross-bar 94 of the support 13. The cross-bar 94 is additionally secured to a pair of vertical rods 95, 96 which are in turn secured to the plate 72. Suitable fluid under pressure once again preferably air, when introduced into the head end of the cylinder 90 drives the second locking member 82 downwardly to engage the face 55 thereof with the face 53 of the first locking member 51, resulting in movement from the position shown in FIG. 1 to that illustrated in FIGS. 2 and 3. Of course, upon introducing fluid into the rod end of the cylinder 90 in the position illustrated in FIGS. 2 and 3 the reverse is accomplished and the elements move to the position shown in FIG. 1.

While relative adjustment between the matrices 23, 25 is provided by the means 77, 78, 80 and 81, any such adjustment due to different size matrices must be followed by an adjustment to accommodate locking between the cooperative locking means 50 at different points between the platens. For example, if larger matrices 23, 25 are substituted for an initial set the support 14 would move vertically upwardly a lesser amount and therefore the faces 53, 55 should meet at a lower point than earlier, and vice versa for narrower matrices. Accordingly, adjusting means 100 are provided including an element 101 having a circular flange 102 at one end and a threaded flange 103 at an opposite end with a bore 104 running the length thereof through which passes the rod 92. The end 103 is threaded to an internal thread 105 of a sleeve 106 which at its lower end is threaded to the second locking element 52. The sleeve 106 has an upper flange 107 and a lower flange 108 which are welded to a cylindrical sleeve 109 having a relatively smooth outer surface. In each of two areas between the exterior of the sleeve 109 and the cylinders 87, 88 is an upright 110, 111 (FIGS. 2 and 3) upon which the flange 102 will abut upon the descent of the second locking member 52, as is most readily apparent from a comparison of FIGS. 1 and 2. Thus, the elements 110, 111 serve as abutments or stops and irrespective of differences in matrices 23, 25 the element 101 may be threaded or unthreaded to vary the relative throw or travel of the cylinder 90 and the rod 92 by limiting through abutment the downward of the locking member 52 by the abutment of the flange 102 against the stops 110, 111.

Prior to describing the operation of the retread machine 10, it will be assumed that the supports or platens 13, 14 are open and in the position shown in FIG. 1, and that all power sources are appropriately connected to a source of high pressure air through a control system having solenoid or similar operated valves, timers, etc. to permit the machine 10 to operate completely automatically after a start button or the like is actuated. It is also assumed that the bead aligner wheels 40, 41 are in the position illustrated in FIG. 1, as is the second locking member 52 and the clamps 57, 58.

After the tire T has been positioned with its beads B, B properly disposed upon the lower bead aligner wheel 41, the operator actuates the machine 10 by pushing a start button which through a suitable control mechanism causes high pressure to be introduced into the cylinder 33 where upon the rod 34 moves upwardly carrying therewith the movable support 14. During the approach of the supports 13, 14 the upper bead B of the tire T contacts the bead aligner wheel 40 whereas the opposing faces of the matrix sections 23, 25 also contact each other. The tire is aligned through the bead aligner wheels 40, 41 in the manner more specifically set forth in U.S. Pat. No. 3,309,737 issued Mar. 21, 1967 is the name of Donald M. MacMillan entitled Tire Mold Bead Aligning Apparatus. As the matrix sections 23, 25 retract under the guidance of the respective surfaces 22, 27 the side walls S, Sl of the tire T contact the respective O-ring seals 31, 76 which precludes air from escaping to atomsphere, as will be more clearly brought out with respect to FIG. 3. Shortly prior to or after the support 14 has reached the end of its travel and the cavity 24 is completed by the retraction of the matrix sections 23, 25 into the respective mold frames 21, 26, the locking mechanism 50 is actuated by the introduction of pressurized air into the cylinder 90 resulting in the descent of the second locking means or member 52 until its face 55 contacts the face 53 of the first locking member 51, as shown in FIG. 2. During this movment it will be noted that the sleeve 109 also moves downwardly and its exterior surface is in contact with the seals 74, 82, 43 and 47. Upon the faces 53, 55 contacting each other the piston rods 60, 61 move outwardly whereupon the clamps 57, 58 clamp the locking means 50 and retain the same locked until the machine cycle times out. Preferably the system includes as a safety feature a pressure sensitive device which maintains the clamps 57, 58 in the positions illustrated in FIGS. 2 and 3 so long as the pressure interiorly of the tire T is 5 p.s.i.g. or above.

The interior of the tire T is inflated and pressurized to maintain the new tread surface in intimate contact with the matrix sections 23, 25 for a predetermined time period during which time the tire T is also heated by the heater 83 which may be of electric resistance type, a radiant heater, or simply hot air which is circulated in a conventional manner. The exterior of the tire may also, of course, be heated. Through suitable ports as, for example, in either of the bead aligner wheels 40, 41, and the respective plates 84, 44 thereof, air is introduced into the generally annular chamber defined by the interior of the tire T, the bead aligner plates 40, 41, and the sleeve 109 which, as was heretofore noted, is sealed by the O-ring seals 43, 82. This internal pressure urges the side walls S, Sl into initmate relationship with the O-ring seals 31, 76, respectively, and thus precludes air from bleeding to atmosphere along the exterior surface of the tire T at the same time pressurized air is also introduced into a generally annular top chamber C1 and a generally annular bottom chamber C2. The chamber C1 is defined by the annular plate 75, the upper plate 73, the upper bead aligner wheel 40, a portion of the sleeve 109, and a portion of the tire side wall Sl, it being again noted that the seals 76, 82 and 74 maintain the chamber C1 closed to atmosphere. Likewise, the chamber C2 is defined by the plate 30, the bead aligner wheel 41, the lower plate 18, a portion of thae sleeve 109, and a portion of the side wall S. The seals 43, 47 and 31 maintain the chamber C2 out of communication with atomsphere. Though the chambers C1, C2 are pressurized the degree of pressurization is less than that internally of the tire T and this allows the beads B, B of the tire T to push the bead aligner rings 40, 41 away from each other during which time th cylinders 87, 88 and those not shown associated with the bead aligner 41 may be slowly bled to atmosphere. In this way the bead aligner wheels 40, 41 move away from each other the beads B self-adjustment which assures that the tire T seats as perfectly as possible within the matrix sections. When the bead aligner wheels 40, 41 are completely retracted (FIG. 3) the three chambers become one so that the same pressure is internally of the tire as is externally thereof between the seals 76, 31, in the ends of the beads B. This again allows the beads B of the tire T to float and as the tread rubber plasticizes and the crown of the tire seats itself into the design of the matrix the beads B seek their own natural position. It has been found that on larger tires the beads B will actually tend to move closer together whereas on smaller tires they will spread further apart.

This permits a wide range of sizes of tires to be properly cured in the same matrix or matrix sections 23, 25.

After a predetermined time period the pressure within now single chamber (FIG. 3) is released, the heater 83 may or may not be cut off, the clamps 57, 58 are opened, the locking member 52 is retracted upwardly, and the platen 14 is retracted downwardly bringing the components of the machine 10 to the position shown in FIG. 1 whereafter tae tire T can be reomoved and the operation repeated.

Figure 4:
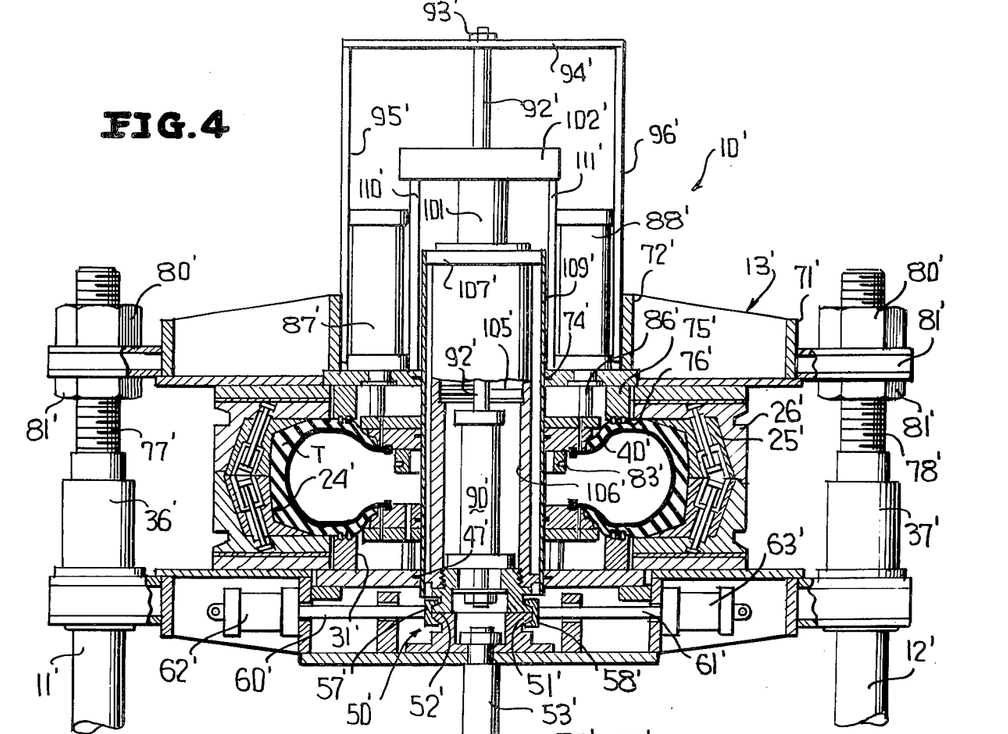
FIG. 4 is a machine viartually identical to the retread machine of FIGS. 1 through 3 except shown associated therewith is a manually inserted bladder inflated to urge the tire into conformity with the matrix cavity.
Figure 5:
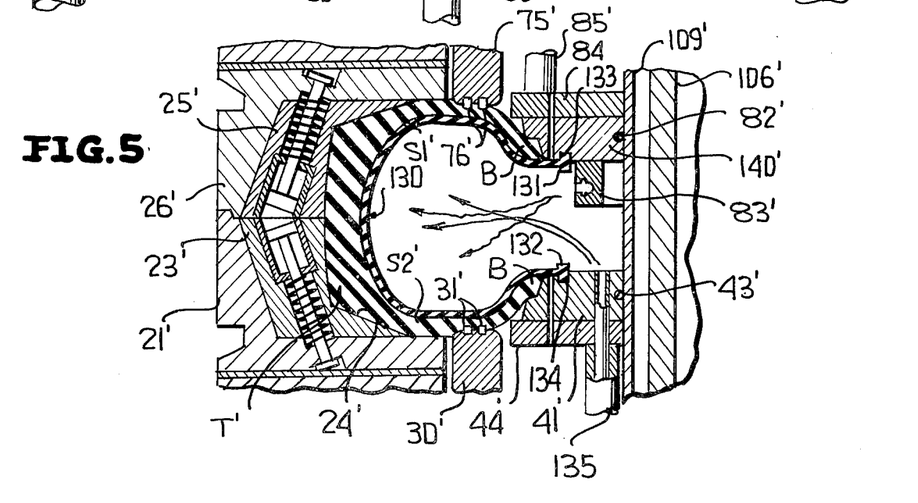
FIG. 5 is a fragmentary enlarged cross-sectional view of a leftmost central portion of the retread machine of FIG. 4, and illustrates the manner in which the bladder is inflated and the tire interiorly heated during a retreading operation.

Reference is now made to FIGS. 4 and 5 wherein is llustrated a retread machine 10' similar to the machine 10 and accordingly duplicate components are identically numbered but primed. The essential difference in the machine 10' is the inclusion of a resilient bag or bladder 130 having lips 131, 132 of a generally rectangular cross sectional configuration which will seat in generally rectangular grooves 133, 134 of the bead aligner wheels 40', 41', respectively. Prior to being inserted between the bead aligner wheels 40'. 41' and in the interior of the tire T', the bladder 130 is somewhat flatter than that illustrated in FIG. 5 and is brought to this configuration by the introduction of pressurized air into its interior through, for example, a conduit 135.

The operation of the machine 10' is substantially identical to that described theretofore relative to the machine 10, except that when the tire T' is positioned atop the bead aligner wheel 41' in the open position (FIG. 2), the bladder or bag 130 is thereafter inserted in its flat state in the tire interior. The lower lip 132 may at this time be inserted into the groove 134. After the closing of the machine, as shown in FIG. 4, the introduction of pressurized air into the interior through the conduit 135 begins inflating the bag 130 causing the same to stretch and eventually lip 131 seats within the groove 133. Heat and pressure are maintained for a sufficient time period after which the system is depressurized, unlocking takes place and the molds may be opened to remove the tire. Thus the machine 10' operates identically as the machine 10 except for the use of the bag 130 which will obviously seal the air inside the tire T' which is highly desirable when defective inner liners of tube type or tubeless tires are being cured. If a tire with a defective inner liner is cured in the machine 10 absent the bag 130 air will seep through the carcass and lodge beteeen the buffed area of the tire and the new tread rubber and eventually cause a separation. This very often results in what is termed in the industry a mold blow which not only ruins the tire carcass but wastes the labor and material used to retread the tire. Furthermore, if these separations are very small they ar not easily detected and the tire may be mounted on the customer's wheel and not separate until in use which is, of course, not only dangerous, but is a definite detriment to the retread industry.

Figure 6:
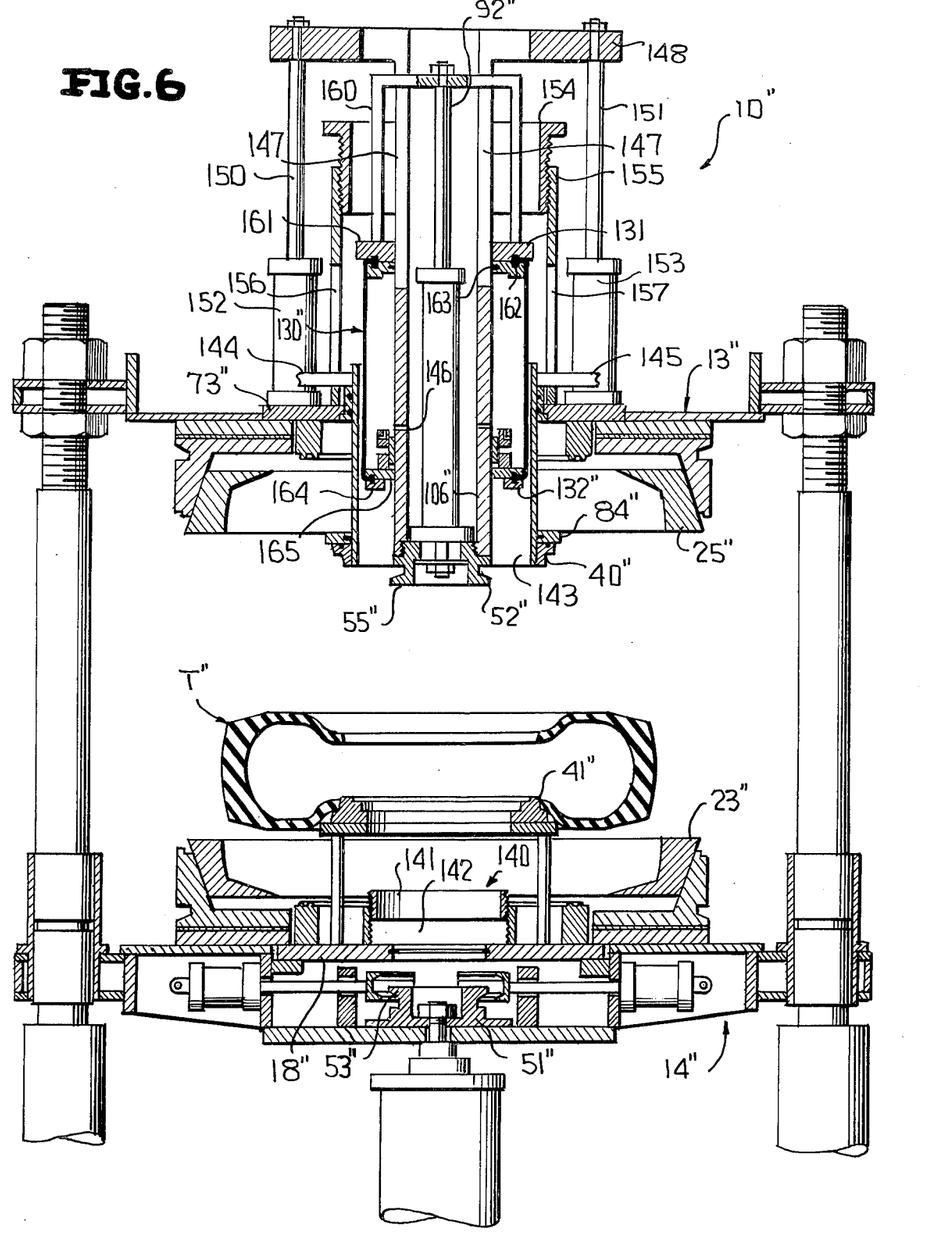
FIG. 6 is a fragmentary vertical sectional view similar to FIG. 1, and illustrates another retreading machine of the bag-type which is fully automatic, noting in particular that the bag or bladder is shown in its generally cylindrical configuration in the open position of the machine.

Reference is now made particularly to FIG. 6 which illustrates another retread machine 10"which due to its similarity to the machines 10 and 10' has affixed thereto double primed reference characters for identical components. However, the machine 10" is designed for the automatic insertion and removal of the bag 130" from the tire T" and in order to do so the lower movable support or platen 14" includes an adjustable stop, generally designated by the reference numeral 140. The stop 140 includes a pair of annular rings 141, 142 which are respectively externally and internally threaded with the latter being welded or otherwise fixedly secured to the plte 18". The ring 141 may be easily elevated or lowered simply by rotating the same relative to the ring 142.

Somewhat more elaborate modifications involve components of the machine 10" carried by the stationary support of platen 13". The upper bead aligner wheel 40" and its plate 84" are secured to a tubular sleeve 143 having welded at its upper end two or more arms 144, 145 which project laterally therefrom and are secured to rods (not shown) corresponding to the piston rods 85, 86 of the machine 10. By suitably pressurizing the corresponding cylinders 87, 88 the bead aligner wheel 40" is moved relative to the lower bead aligner wheel 41" is much the same as that heretofore described.

The lower locking member 52" is likewise threadably secured to a sleeve 106" is likewise threadably secured to a sleeve 106" but the latter is unthreaded and instead includes one or more radial ports 146 to which may be secured high pressure fittings and its upper portions is provided with a pair of slits 147, 148. The upper portion also terminates in an outwardly directed flange 148 to which is secured a pair of rods 150, 151 of a pair of pistons 152, 153, respectively. By appropriately gating air into the cylinders 152, 153 the rods 150, 151 can be lowered drawing downwardly therewith the second locking member 52". Likewise opposite movement will draw the lcoking member 52" upwardly. However, during the downward stroke the descent thereof can be limited in much the same manner as that of the machine 10, namely, by providing a pair of sleeves 154, 155 which are respectively externally and internally threaded. The sleeve 155 is welded to the plate 73" and includes lots 156, 157 through which may freely pass the arms 144, 145, respectively. As is readily apparent from FIG. 6, upon downward movement of the rods 150, 151 the flange 148 will bottom atop the sleeve 154 to limit downward movement of the second locking member 52" thereby accurately locating the position of its bottom face 55" with respect to the face 53" of the first element 51".

Secured to the rod 92" is an inverted generally U-shaped arm 160 by means of suitable nut with lower ends of the arms 160 being bolted to an annular or circular plate 161. The lip 131" of the bag 130" is connected to the plate 161 by another circular plate 162 bolted or otherwise secured thereto, it being noted that the plate 162 includes an O-ring seal 163. The bottom of the bag 130" is likewise secured by means of its lip 132" to a pair of plates 164, 165, the latter of which includes an O-ring seal 166. The plate 164 bottoms upon the ring 141 (FIGS. 6 and 8) to limit the downward movement of the bag 130" during the closing of the matrix sections 23", 25", in a manner to be described hereinafter.

The machine 10" also includes a second pair of sleeves 170, 171 (FIG. 8) which are respectively externally and internally threaded to permit adjustment between an end face 172 of the sleeve 171 and the plate 165 upon which rests a heater 173 threadably connected to the sleeve 170. The purpose of this adjustment is to limit the downward descent of the plates 161, 162 due to the abutment of the latter upon the face 172, in the manner best illustrated in FIG. 8. It will also be noted that the sleeve 171 has a port 175 which is the closed position (FIG. 8) aligns with the port 146 of the sleeve 106" which, as was described earlier, is provided with an appropriate fitting coupled to a source of pressurized air.

Figure 7:
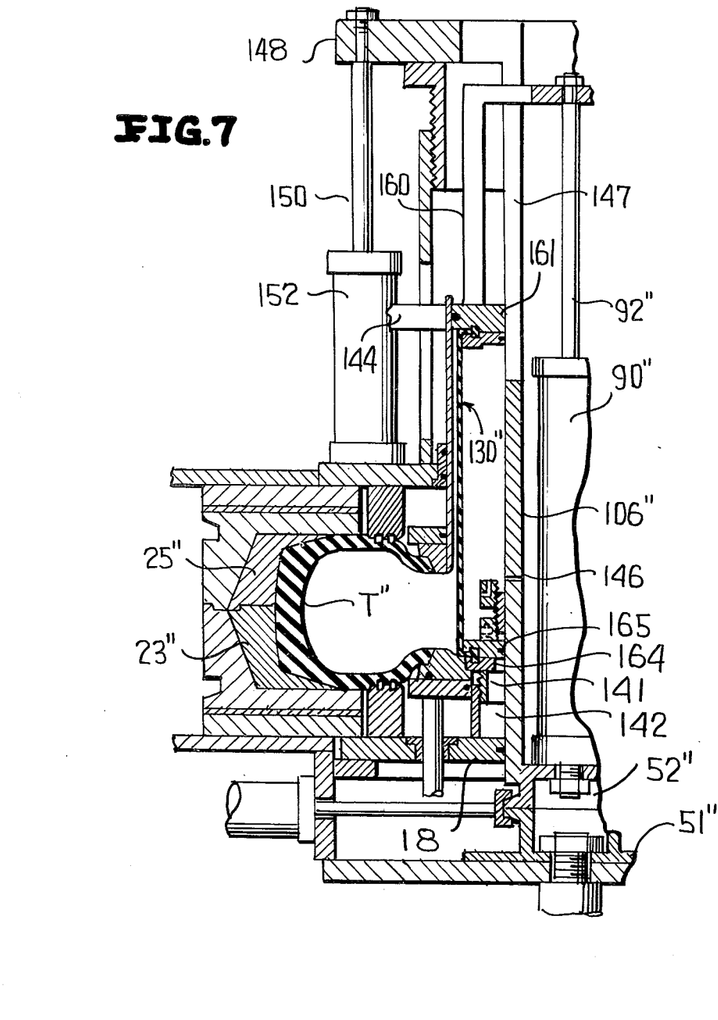
FIG. 7 is a partial fragmentary sectional view of the retread machine of FIG. 6, and illustrates the manner in which the matrices have been closed, movable platens or supports thereof locked, and the position of the bladder prior to its insertion into the interior of the tire.
Figure 8:
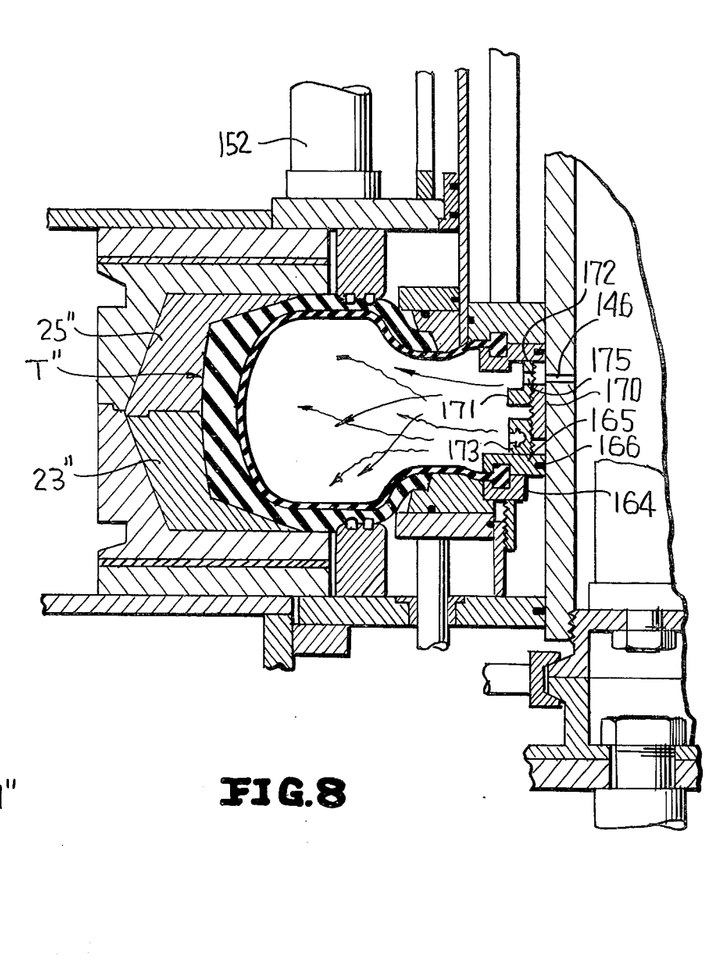
FIG. 8 is an enlarged fragmentary sectional view of the left-hand portion of FIG. 7, and illustrates the final position of the atuomatically inserted bladder with the interior thereof being heated and pressurized.

Assuming that the components of the machine 10'' are positioned as shown in FIG. 6, and that the tire T'' is seated upon the lower bead aligner wheel 41'', the system is energized to elevate the support 14'' causing the eventual closing of the matrix sections 23'', 25''. At the same time or thereafter air introduced into the cylinders 152, 153 descend the rods 150, 151 to bring the faces 153'', 155'' into contact after which the latter are clamped locked by the clamps 57 41 , 58''. The downward movement of the locking element 52'' is, of course, limited by the contact of the flange 148 upon the sleeve 154 (FIG. 7). The same downward movement of the sleeve 106'' draws with it downwardly the membrane or bag 130'' whereupon the plate 164 eventually abuts the ring 141. Thereafter further downward movement transforms the cylindrical shape of the bag 130'' to a generally annular configuration, as shown in FIG. 8, and during the same air emitted thereinto through the ports 146, 175 cause the inflation thereof. Thus the bag 130'' is mechanically urged to its annular configuration and this is augmented by pressurized air in order that the bag is not pinched, creased or cut as the components of the machine move during the closing operation. Eventually the closed configuration best shown in FIGS. 7 and 8 is achieved after which heated air and internal pressure are maintained until a desired time period has passed after which the machine opening operation is initiated and completed in the manner opposite that described.

While preferred forms and arrangement of parts have been when in illustrating the invention, it is to be clearly understood that various changes in details and arrangement of parts may be made without departing from the scope and spirit of this disclosure.

I claim:

1. A retread mold comprising first and second relatively movable supports, cooperative matrix portions carried by said supports, means for imparting relative movement to said supports to move said matrix portions between open and closed positions in the latter of which said matrix portions define an annular cavity adapted to receive a tire to be retreaded, means for selectively adjusting the distance between said movable supports with respect to the closed position of said matrix portions to accommodate tires of different widths in said cavity, means for locking said movable supports relative to each other in the closed position of said matrix portions at all distances between said movable supports when said matrix portions are in the closed position thereof, said locking means having cooperable locking portions carried by both said movable supports, means for adjustably varying the length of at least one of said locking portions to securely lock said movable supports together with said matrix portions in the closed position irrespective of the distance between said movable supports in said last-mentioned position, a pair of vertical supports, means mounting said first relatively movable support for vertical reciprocal sliding motion upon said pair of vertical supports, said length adjusting locking means including an internally threaded mounted for vertical sliding movement relative to said first support, said tube having upper and lower end portions, said lower tube end portion carries one of said cooperable locking portions a screw threaded to said internally threaded tube, a fluid cylinder and piston rod both diposed at least partially within said tube, means connecting one of said cylinder and rod to said tube means connecting another of said cylinder and rod to said first support, and stop means for limiting the travel of said tube in a direction toward said locking portion of a second of said supports.

2. The retread mold as defined in claim 1 wherein one of said cylinder and rod passes through a bore of said screw.

* * * * *